US007040232B2

(12) United States Patent
Van Holten et al.

(10) Patent No.: US 7,040,232 B2
(45) Date of Patent: May 9, 2006

(54) METHOD AND SYSTEM FOR MONITORING PRINTED MATERIAL PRODUCED BY A PRINTING PRESS

(75) Inventors: Erik Van Holten, Oosterhout (NL); Menno Jansen, Raamsdonksveer (NL)

(73) Assignee: Q. I. Press Controls Holding B.V., (NL)

( * ) Notice: Subject to any disclaimer, the term of this patent is extended or adjusted under 35 U.S.C. 154(b) by 0 days.

(21) Appl. No.: 10/830,856

(22) Filed: Apr. 23, 2004

(65) Prior Publication Data

US 2005/0199151 A1 Sep. 15, 2005

(30) Foreign Application Priority Data

Mar. 12, 2004 (NL) .................................... 1025711

(51) Int. Cl.
*B41F 1/54* (2006.01)
*B41F 31/02* (2006.01)
*G06K 15/00* (2006.01)

(52) U.S. Cl. ...................... 101/484; 101/365; 101/486; 358/1.15; 358/1.6

(58) Field of Classification Search ................ 101/484, 101/365, 486, 483; 358/1.6, 1.15
See application file for complete search history.

(56) References Cited

U.S. PATENT DOCUMENTS 4,307,962 A * 12/1981 Jung .......................... 356/405
4,433,385 A * 2/1984 De Gasperi et al. ......... 382/149
4,677,680 A * 6/1987 Harima et al. .............. 382/112
4,852,485 A * 8/1989 Brunner ....................... 101/211
4,932,320 A * 6/1990 Brunetti et al. ............. 101/181
5,018,213 A * 5/1991 Sikes ........................... 382/112
5,187,376 A * 2/1993 Hashimoto et al. ..... 250/559.02
5,440,402 A * 8/1995 Okuda et al. ............... 358/406
5,632,201 A * 5/1997 Roch ........................... 101/211
5,689,425 A * 11/1997 Sainio et al. ............... 700/124
5,699,450 A * 12/1997 Stearns et al. .............. 382/156
5,764,386 A * 6/1998 Robinson ..................... 358/504
5,774,635 A 6/1998 Kuusisto et al. ........... 358/1.15
5,835,626 A * 11/1998 Huber et al. ................ 382/167

(Continued)

FOREIGN PATENT DOCUMENTS

DE 198 55 177 A 6/2000

(Continued)

OTHER PUBLICATIONS

Handbook of Print Media, Helmut Kipphan, 2001, pp. 986-987.*

*Primary Examiner*—Daniel J. Colilla
*Assistant Examiner*—Wasseem H. Hamdan
(74) *Attorney, Agent, or Firm*—The Webb Law Firm

(57) ABSTRACT

A method for monitoring printed material which is produced by a printing press and includes images printed on a paper web. The method includes the steps of determining, in an original, reference values for chosen parameters of the printed material, detecting the values of these parameters in the corresponding printed image, comparing the detected values to the reference values, and performing a correction when a difference in these values is found during the comparison. The chosen parameters may include the colours in the printed material, the location of the images in the printed material and/or the colour register of the printed material. A system for performing this method includes a reference value determining device, a detecting device and a comparing and correcting device connected to the reference value determining device and the detecting device.

35 Claims, 12 Drawing Sheets

U.S. PATENT DOCUMENTS

| | | | | |
|---|---|---|---|---|
| 6,024,018 | A | 2/2000 | Darel et al. | 101/365 |
| 6,108,436 | A * | 8/2000 | Jansen et al. | 382/112 |
| 6,450,097 | B1 * | 9/2002 | Kistler et al. | 101/483 |
| 2004/0042022 | A1 * | 3/2004 | Friedman et al. | 358/1.9 |

FOREIGN PATENT DOCUMENTS

| | | | |
|---|---|---|---|
| DE | 199 40 879 | A1 | 3/2001 |
| EP | 0 850 763 | A1 | 7/1998 |

* cited by examiner

METHOD AND SYSTEM FOR MONITORING PRINTED MATERIAL PRODUCED BY A PRINTING PRESS

BACKGROUND OF THE INVENTION

1. Field of the Invention

The invention relates to a method for monitoring printed material which is produced by a printing press and comprises one or more images printed on a substrate, in particular a paper web.

2. Description of the Related Art

In a printing process, for instance a rotation offset printing process, a large number of identical copies is made on the basis of an original, for instance an illustration or a text. It is of great importance here that the images in the printed material are transferred to the substrate for printing, generally a paper web, as far as possible in colour-true, correctly positioned and consistent manner. "Colour-true" is here understood to mean that the printed colours correspond precisely with the colours of the original which is being duplicated. This is especially important for advertisers, who increasingly use a colour as a mark and therefore wish to see it printed correctly. The correct position is important because it determines the general picture of the printed material, while consistency is important in order to indeed be able to ensure identical copies of the printed material.

A problem which occurs here is that the final colour of a printed image is influenced by a large number of variables which cannot be fully monitored during printing. Differences will thereby occur between the original and the printed images. In order to be able to understand the causes of these differences, some insight into the nature of printed materials is required.

Printed materials are built up of grid points or dots. The printed image is determined by two quantities, the number of grid points per unit of length, usually expressed in "dpi" (dots per inch), which specifies how fine or crude the image is, and the relation between light and dark, the tonal range. As long as the tonal range takes on values of less than 50%, the image is formed by dark, thus printed dots on a light background, while for higher values use is made of light dots, thus dots not printed in the surrounding, printed background.

During the different steps which must be performed during the printing process to form a printed image from an original, there do however occur differences in the size of the grid points; the points grow, designated as "dot gain" or shrink, designated as "dot loss". The final printed image hereby differs from the original. The degree to which this occurs depends on a large number of variables associated with the printing process, and on the original size of the grid points. The finer the printed material is, i.e. the closer together the grid points, the greater the differences are. Furthermore, the differences are often relatively greatest in parts of the printed material where the tonal range amounts to about 50 percent.

In practice therefore, printing presses are calibrated before use. Proofs are made with different finenesses and different tonal ranges, and the differences are determined from these proofs. These measured differences are stored in the form of calibration graphs, so-called dot gain curves. These graphs are used to determine the theoretical optimal settings of each printing press when an original with a determined fineness and tonal range is presented.

As stated, there are many variables whereby the quality of the final printed material is influenced. Envisaged here are the type of paper used, the water-ink balance, the temperature, possible contamination of the ink or the ink rollers, the pressure between the different ink rollers, vibration occurring in the printing presses and the like. A change in just one of these quantities can result in an increase or decrease in size of the grid points, and therefore in differences in the printed colours. Because it is almost impossible to hold all these quantities constant during the printing process, different methods have been developed to control these quantities on the basis of inspection of the colours such that the quality remains constant.

There are thus so-called open loop control methods, wherein random samples of the printed material are monitored using hand-held measuring devices. These hand measuring devices monitor a separately co-printed colour bar. When differences are detected an operator can change the settings of the printing press. A drawback of this control method is the discontinuous and even informal nature thereof. Between two consecutive random samples a large quantity of printed material of substandard quality can be produced. This method moreover requires the presence of an often expensive operator.

Fully closed control methods have therefore been developed, wherein measuring and control systems monitor the quality of the printed material fully autonomously and adjust the settings of the printing press when differences are detected. These known systems are also based on a co-printed colour bar. There are two major trends here. Known in the first instance are systems wherein the colour bar consists of areas which are completely covered with the basic colours C (cyan), M (magenta), Y (yellow) and K (black), whereby the colour density (thickness of the ink layer) can be measured. In improved systems the colour bar also comprises grey areas, including a black area with 50% tonal range and an area with cyan, magenta and yellow in quantities such that black printed material with 50% tonal range is likewise obtained. Differences in the size of the grid points of cyan, magenta and yellow can be determined by comparing these areas. These closed control methods also have the drawback that a separate colour bar has to be co-printed for this purpose. If this colour bar is not cut away, the appearance of the printed material is impaired. The co-printed colour bar is otherwise also used to monitor the positioning of the printed material on the paper web and/or to monitor the relative location (register) of the different colours, as described in the older European patent 0 850 763 of applicant.

A drawback of both the open and closed control methods is that the printing press must be properly adjusted so as to ensure that a correctly printed colour bar also actually means that the total printed image is correct, since the colour bar is situated outside the normal printed image, and usually also differs greatly from the average printed image in respect of the colours used therein.

SUMMARY OF THE INVENTION

The invention therefore has for its object to provide a method for monitoring printed material as described above, wherein the above stated drawbacks do not occur. According to the invention this is achieved by a method comprising the steps of determining, in at least one original for printing, reference values for one or more chosen parameters of the printed material, detecting the values of these parameters in a corresponding printed image, comparing the detected values with the reference values, and performing a correction when a difference in one or more values is found during the comparison. Making use of the image itself instead of a separate colour bar to monitor the printed material ensures that under all conditions a correct printed image is obtained, irrespective of the settings of the printing press. This moreover saves ink.

The chosen parameters can comprise the colours, the location of the images and/or the colour register of the printed material. Monitoring whether the printed material is lying in register can in this way be combined with monitoring of the colours. It is thus possible to dispense with co-printing of separate marks in the margin of the printed material for the purpose of register control, while automatic start-up can still take place, because when the printing press is started up it is already known what the printed image should look like. This method of controlling the colour register is moreover more accurate, since the colour register of the whole printed material is controlled, and not only that of the marks on the edge of the printed material.

This register control integrated into the colour measurement also provides great advantages for monitoring the so-called fan-out, the deformation of the paper web as a result of it becoming wet, since the degree of fan-out depends on the degree of wetting, and thus varies greatly over the surface of the printed material. Colour photos, in which a lot of ink is used, will thus give a greater fan-out than text blocks with only a small quantity of black ink. A better control becomes possible by now monitoring the fan-out on the basis of inspections in the whole printed material, instead of only on the basis of a number of marks in the margin.

An effective monitoring is achieved, when the reference values are determined in automatically chosen regions within the at least one original, and the inspection takes place in the corresponding regions in the printed image. It is thus not necessary to monitor the entire image, but only representative parts thereof, whereby monitoring takes less time and effort.

When as is usual the colours for printing are built up of a number of basic colours, it is recommended that the regions are chosen such that each basic colour is present in at least one region. In this manner all colours can be monitored.

A very good monitoring of the quality of the printed material is achieved when a number of inspections are performed for at least some of the colours, and a quality factor for the relevant colour(s) can be derived from the differences found. Differences can thus be clearly defined as a function of the tonal range.

When the at least one original is available in the form of a digital data file and the inspection of the printed image is digitized prior to the comparison, the control can be performed using computer-controlled equipment. The digital data-file can be pre-processed to correct differences during printing, in which case the reference values are preferably derived from the data file by undoing the pre-processing. Use is thus made for control purposes of the original in the form in which it was originally intended.

In order to enable simple application of the results of the inspection in the printing process, RGB colour codes in the digital inspection of the printed image are preferably converted prior to the comparison to CYMK-colour codes on the basis of lookup tables.

A rapid and simple control of the colours is obtained when the correction is performed by adjusting a quantity of ink applied to the substrate by the printing press. This quantity of ink applied to the substrate is advantageously then adjusted by adjusting a quantity of ink and/or water supplied to the printing press. Differences can thus be corrected quickly, without the underlying causes having to be known or having to be removed.

Because some time will pass before a control operation has an effect on the inspected printed material, it is recommended that after a correction has been performed a subsequent inspection and comparison is only carried out after a waiting time has elapsed. This prevents unnecessary control operations being carried out.

The magnitude of the differences is preferably determined and subject hereto a choice is made for performing the corrections between at least a cruder and a finer adjustment. In the case of large differences the printed material can thus be quickly restored to within acceptable, relatively wide quality limits, while in the case of smaller differences the printed material can be adjusted somewhat more slowly but more accurately to an optimal quality. It is further recommended here that a warning signal be given when the magnitude of the differences exceeds a determined limit value. In this manner differences which cannot be corrected with the usual correction mechanisms, for instance because a printing plate is mounted incorrectly on one of the presses or the ink supply has become blocked, can be pinpointed immediately.

In order to enable a rapid adjustment, inspection preferably takes place while the printed material is still wet, wherein the detected colours for comparing are then corrected for colour changes during drying. The detected colours for comparing are preferably also corrected for ambient influences such as temperature and air humidity, so that the same quality of printed material is produced under all conditions.

The adjustment of the colours according to the invention advantageously takes place on the basis of CIELAB colour value, density, size of grid points and/or contrast value.

The printed material is preferably illuminated constantly during the inspection, so that ambient light cannot have an undesirable effect on the inspection.

The invention further relates to a system with which the above described method can be performed. According to the invention such a system comprises a device for determining, in at least one original for printing, reference values for one or more chosen parameters of the printed material, a device for detecting the values of these parameters in a corresponding printed image, a device connected to the determining device and the detecting device for comparing the detected values with the reference values, and a device connected to the comparing device and controlling the printing press for carrying out corrections when the comparing device finds a difference in one or more values.

Finally, the invention further relates to a determining device, detecting device and comparing and correcting device which are intended for use in a monitoring system as described above.

BRIEF DESCRIPTION OF THE DRAWINGS

The device will now be elucidated on the basis of an embodiment, wherein reference is made to the annexed drawing, in which.

DETAILED DESCRIPTION OF THE PREFERRED EMBODIMENTS

Figure 1:
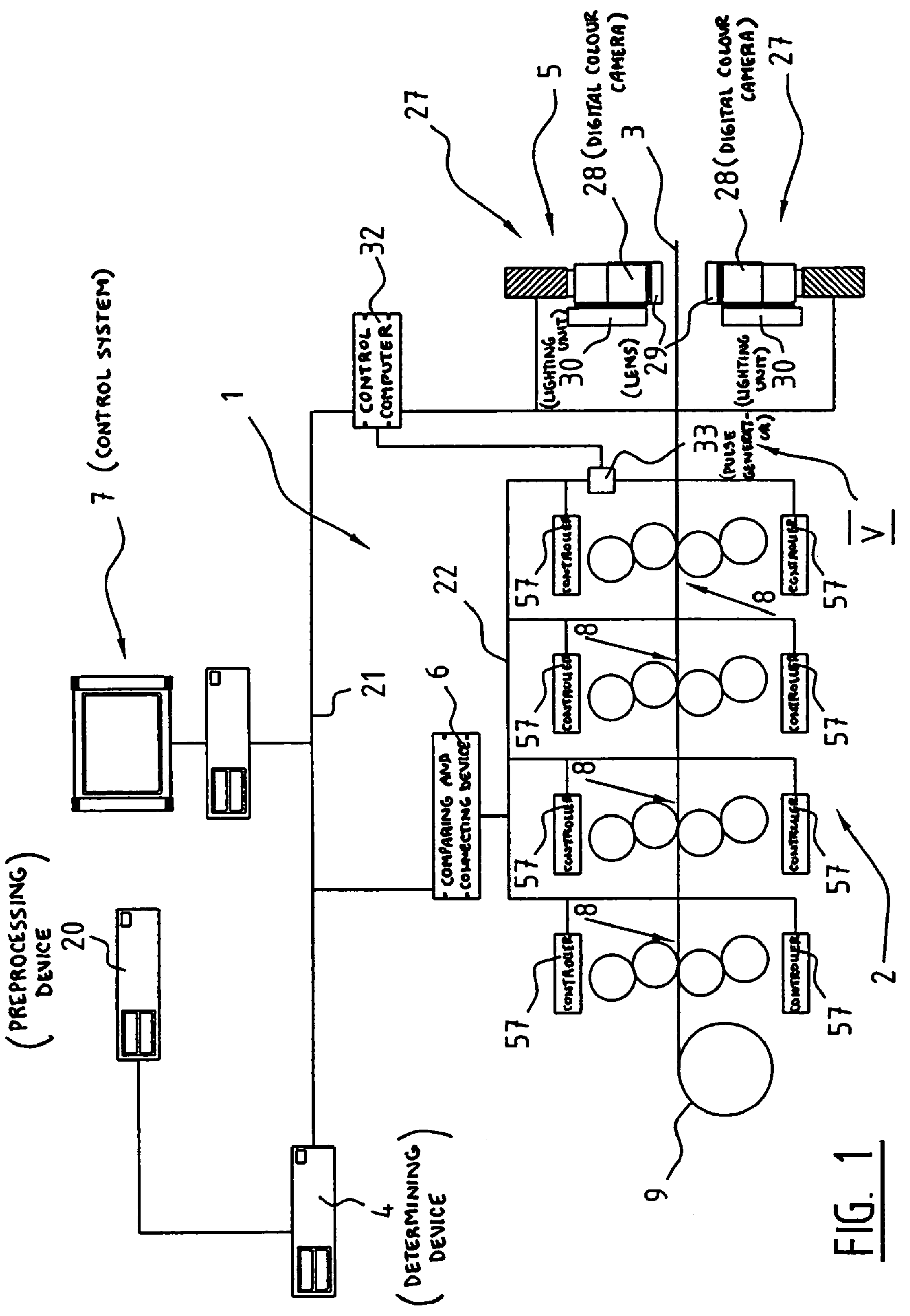
FIG. 1 is a schematic representation of the main components of a monitoring system according to the invention in combination with a four-colour printing press.

A system 1 for monitoring and correcting printed material which is being produced by a printing installation 2, and which comprises one or more images I printed on a paper web 3, consists of a number of devices 4 to 6 co-acting with each other and with printing installation 2 (FIG. 1).

These devices are respectively a device 4 whereby reference values for a number of parameters of the printed material, including the colours for printing and the location of illustrations and text, are determined in one or more originals for printing O, a device 5 which detects the values of these parameters, such as the colours in the relevant images I which are printed on paper web 3, and a device 6 for comparing the detected values with the reference values and for performing corrections in case of a difference in one or more values. The comparing and correcting device 6, which is connected to both the determining device 4 and the detecting device 5, controls printing installation 2.

The operation of these different devices 4–6 and of printing installation 2 with all peripheral equipment is controlled as a whole by a general control system 7. This control system also provides the communication with operating personnel, and for instance displays status information and error messages on a display. Devices 4–6 of monitoring system 1 are connected to each other and to control system 7 via a network 21 developed by applicant. The comparing and correcting device 6 is connected to printing installation 2 via an network 22 forming part of this installation.

In the shown embodiment the monitoring system according to the invention is applied in combination with an offset printing installation. The method and the system according to the invention could also be applied in other printing processes, such as flexo-printing or screen printing.

Figure 2:
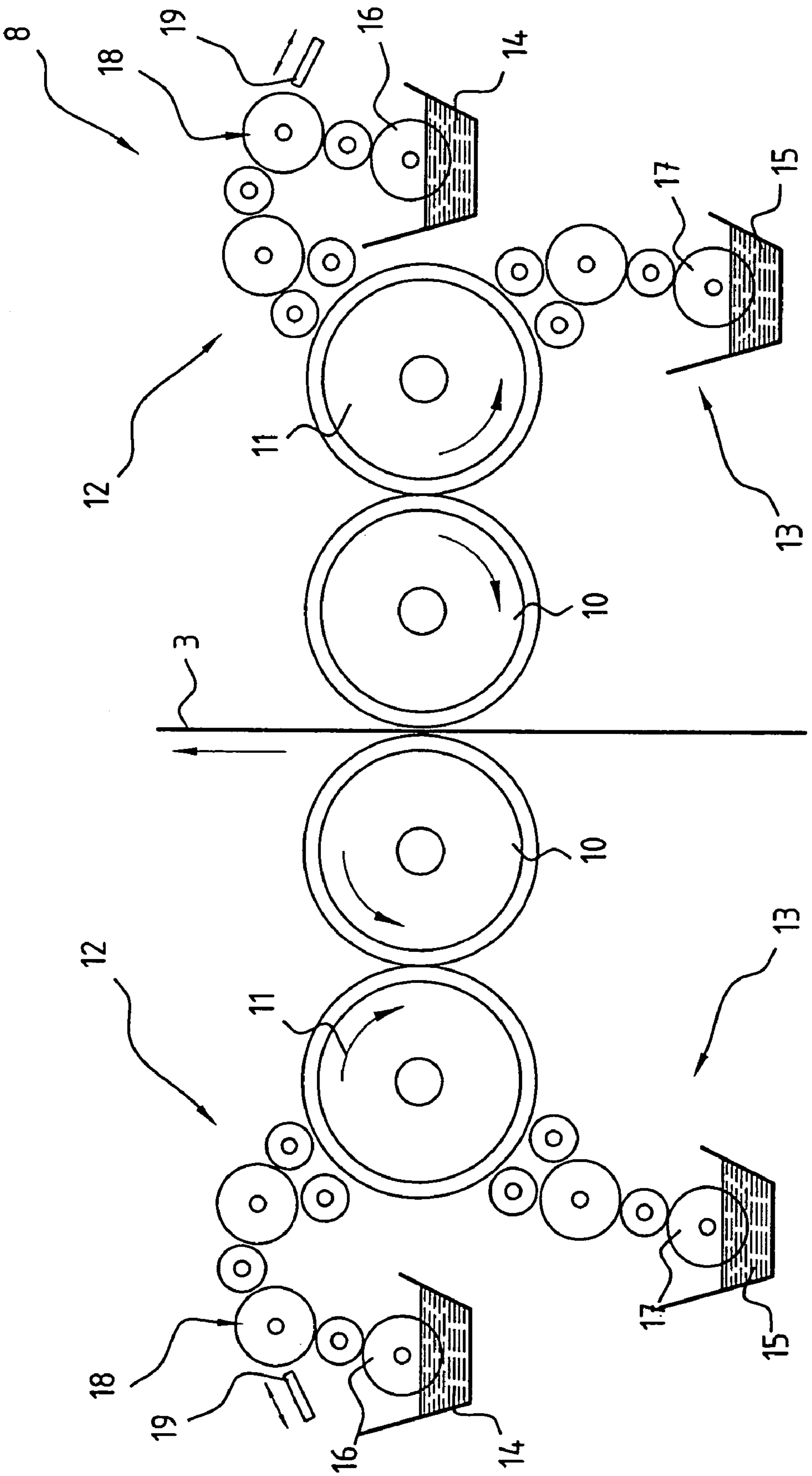
FIG. 2 is a schematic representation of the construction of one of the four printing presses.
Figure 3:
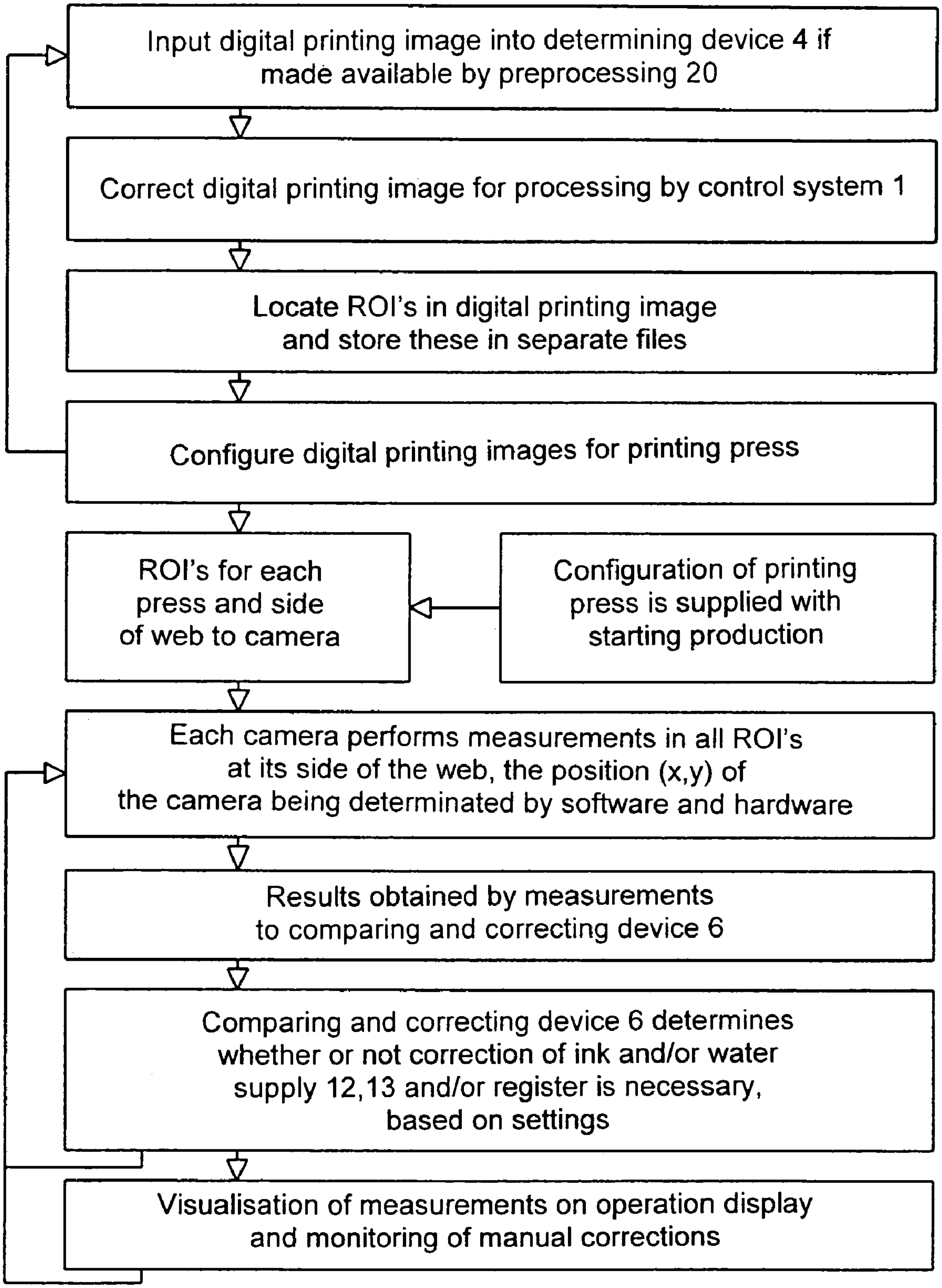
FIG. 3 is a flow diagram showing the most important steps of the method according to the invention for adjusting colours in printed material.
Figure 4:
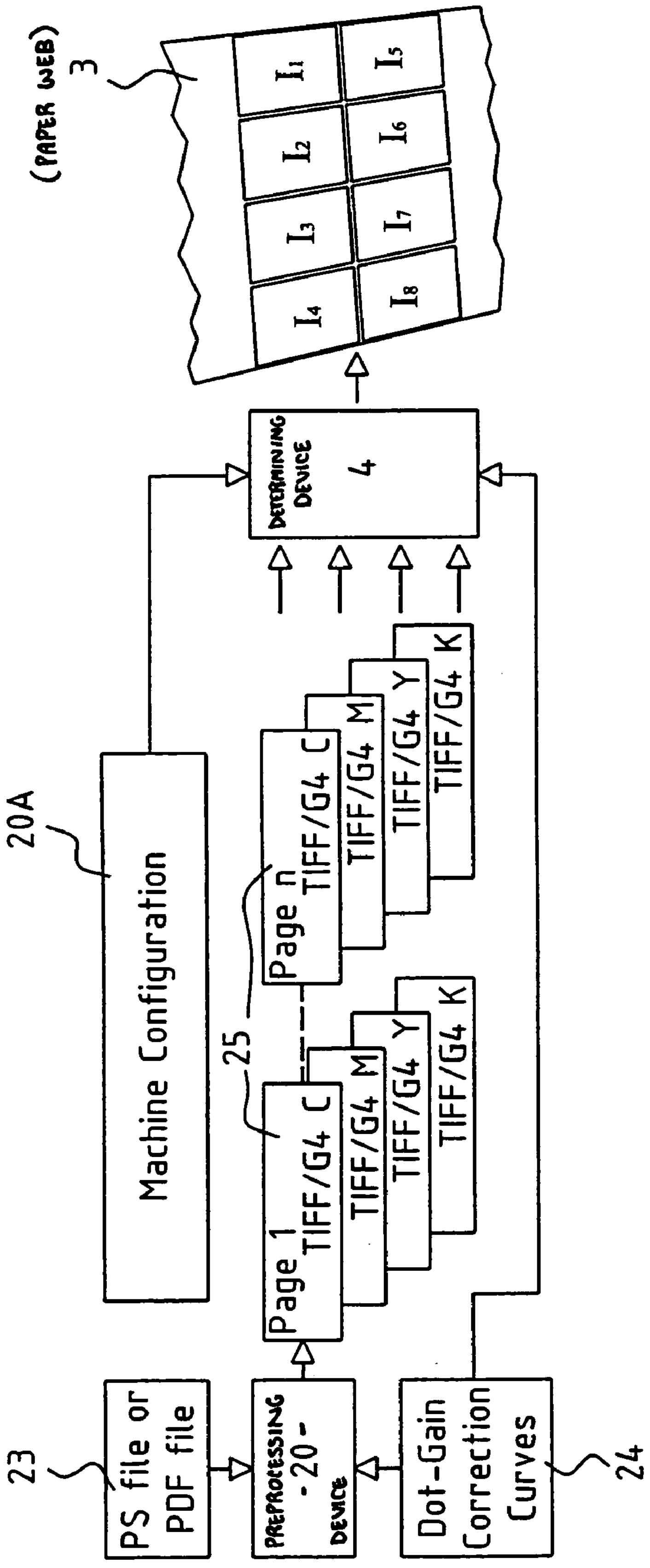
FIG. 4 shows schematically how the reference values for the colours can be derived from the original digitized image.

Printing installation 2 is adapted to produce four-colour printed material, and comprises four printing presses 8. Each printing press 8 prints one of the basic colours C (cyan), M (magenta), Y (yellow) and K (black) on paper web 3, which is supplied from a paper roll 9. Paper web 3 is printed double-sided, and each printing press 8 therefore comprises on either side of paper web 3 a rubber cloth cylinder 10, a cylinder 11 engaging thereon which carries a photographic plate, an ink supply mechanism 12 connected to the photographic plate-cylinder 11 and a water supply mechanism 13 likewise connected to cylinder 11 (FIG. 2).

Both the ink supply 12 and water supply 13 are formed in the shown embodiment by a reservoir 14, 15 respectively filled with ink, water respectively, in which rotates a first roller 16, 17 respectively. This roller 16, 17 brushes over the surface of the ink respectively water, whereby this latter is entrained on roller 16, 17. It is otherwise also known in printing installations for newspapers to spray the water onto one of the rollers by means of spray nozzles, the so-called spray bar system.

The quantity of ink entrained by roller 16 and transferred to a subsequent roller 18 is determined by so-called ink keys 19A, 19B, . . . 19X (FIG. 5), which are arranged distributed in longitudinal direction along roller 18. These ink keys 19A, 19B, . . . 19N can be moved reciprocally transversely of roller 18 in the direction of the arrows, whereby the distance between the keys and the roller, and thereby the thickness of the ink layer on roller 18, can be varied.

Figure 12:
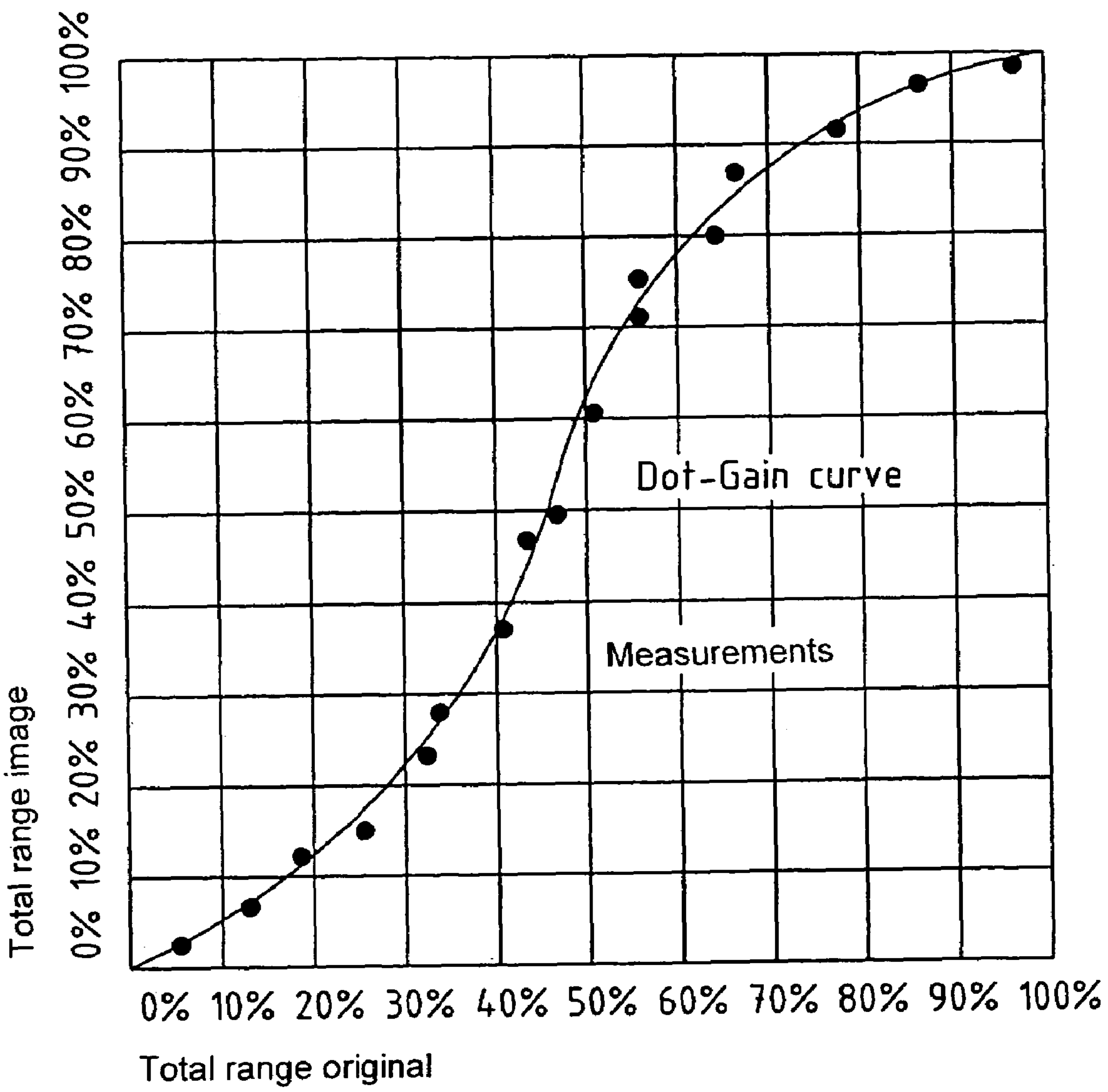
FIG. 12 shows an example of a curve representing the variation of grid point size as a function of the tonal range.

When newspapers are for instance printed on a so-called double wide/double size printing installation 2, in practice eight pages at a time are printed simultaneously on either side of paper web 3. This therefore means that on each photographic plate-cylinder 11 eight images I1–I8, respectively I9-I-16 are formed. These images I are generally supplied by a publisher or editorial staff in digital form. At a printing company these digital files 23 are separated, usually in a preprocessing device 20, the so-called pre-press, into reference files per colour (C, Y, M, K), so that four colour files 25 are formed for each image I. These colour files are already corrected herein on the basis of calibration graphs 24 (FIG. 12) for the expected differences in printing presses 8. These calibration graphs or dot gain curves give for each value of the tonal range of the original, in this example plotted along the horizontal axis, the empirically determined value of the tonal range in the final printed image I.

The corrected colour files can be expressed in a standard data format for printers, for instance TIFF/G4. In the preprocessing device 20*a* is determined how and where the images I must be printed on paper web 3, wherein the manner in which paper web 3 is folded and cut after printing is taken into account.

In the shown embodiment the determining device 4 is adapted to determine from the digital files 25 with the print images I a number of regions, also referred to as ROIs (Regions Of Interest), which can be used to monitor the quality of the printed material. In this way it is not necessary to compare each image I fully with the original O, so that the number of inspections required and the associated computations remain limited.

So as to be able to check the quality of the printed material against the original, this original O must first be derived from the digital files 25 supplied by preprocessing device 20. This takes place by undoing the corrections carried out in the preprocessing. On the basis of the same calibration graphs 24 used in the preprocessing the corrected data are restored as well as possible to the original inputted data.

The thus obtained data files are subsequently compressed using applicant's own protocol, in order to allow the further processing to take place more rapidly. A search is then made in the compressed files for regions where the monitoring of the quality of the printed material can be carried out.

Figure 6:
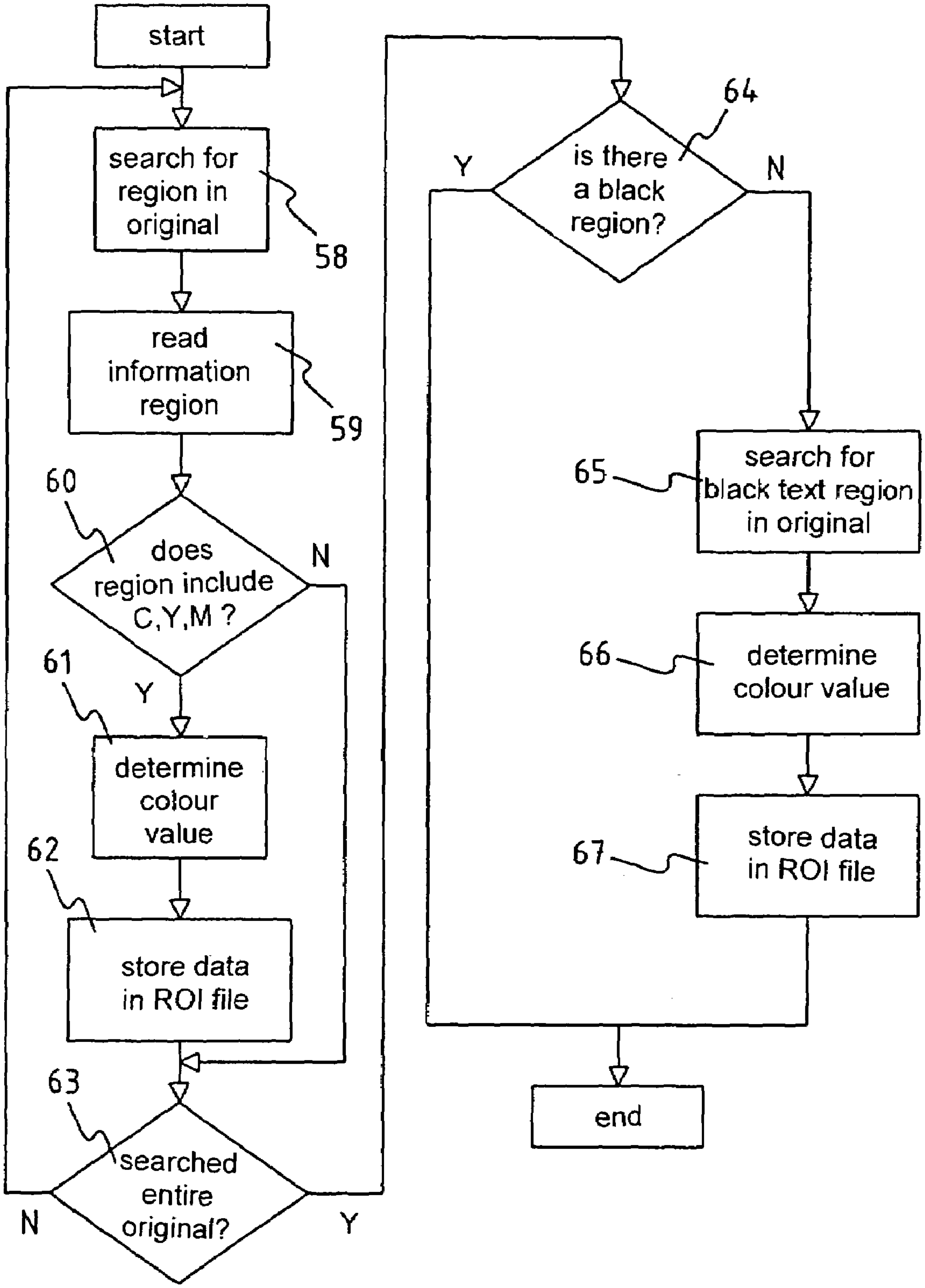
FIG. 6 is a flow diagram showing the selection of the regions.

Printed material generally consists of text blocks and illustrations, which are separated from each other by non-printed and therefore white areas or margins. In determining of the ROIs' all parts of the original O separated by margins are successively assessed. For this purpose a search is made in a first region in the original (FIG. 6, step 58) and the information from this region is read in (step 59). A check is then made whether one or more of the colours C, Y and M are represented in this region (step 60).

If this is the case, the colour values of the located colours are then determined (step 61) and the relevant data, together with the position of the region in the original O, expressed in x,y-coordinates, are stored in a ROI-file (step 62). Also included in this ROI file is the location of the relevant image I in the printed material. This follows from the configuration 26 of printing presses 8, which is sent to determining device 4 shortly before the start of printing. A check is then made whether the entire original O has meanwhile been searched (step 63). If this is not the case, the program returns to 58, and a search is made in a subsequent region within the original O.

When it is determined in step 60 that none of the colours C, Y or M are present in the region, this latter must then obviously be a black text area which in principle cannot serve as ROI. A jump directly to step 63 is then made.

If in step 63 it is determined that the entire original has been searched, step 64 checks whether the colour black (K) is present in at least one of the located ROIs. If this is the case, the determination of the ROIs can then be stopped. If however there is still no ROI with the colour black therein, a search is then made for a black text region which must serve as ROI (step 65), and the colour values of the located colours are determined therein (step 66), whereafter these data with the position of the text part are again stored in a ROI file (step 67). All colours are in any case hereby present in one of the ROIs, whereafter the determination can be ended.

For each ink key 19 and each colour C, Y, M and K as many measurements as possible are carried out with varying tonal ranges. Although the greatest variations are detected particularly at values of the tonal range of around 50 percent, other values are of great importance for the quality of the printed material. For instance in the case of a very small tonal range of about 1 percent, any variation thus stands out sharply, although it might not catch the eye at a tonal range of 50 percent. In this manner the fullest possible dot gain curve is built up for each ink key and for each colour. Here the variations relative to the thus determined dot gain curves at different points in the printed image then finally form a measure for differences to be corrected in the printing press.

The thus formed ROI files are passed from determining device 4 to the comparing and correcting device 6, where they are read and serve as reference against which the detected colours of the printed material are checked. The ROI-files are also sent to detecting device 5, so that this latter can perform inspections at the correct locations within the printed images I. A position recognition of each ROI from the original O per colour is herein also sent, so that on the basis thereof the inspection of the printed image I in x and y direction can be synchronized per colour with the ROI in the original O. This is important in order to be able to also use the inspection for the control of the colour register, fan-out register and the like.

Figure 13:
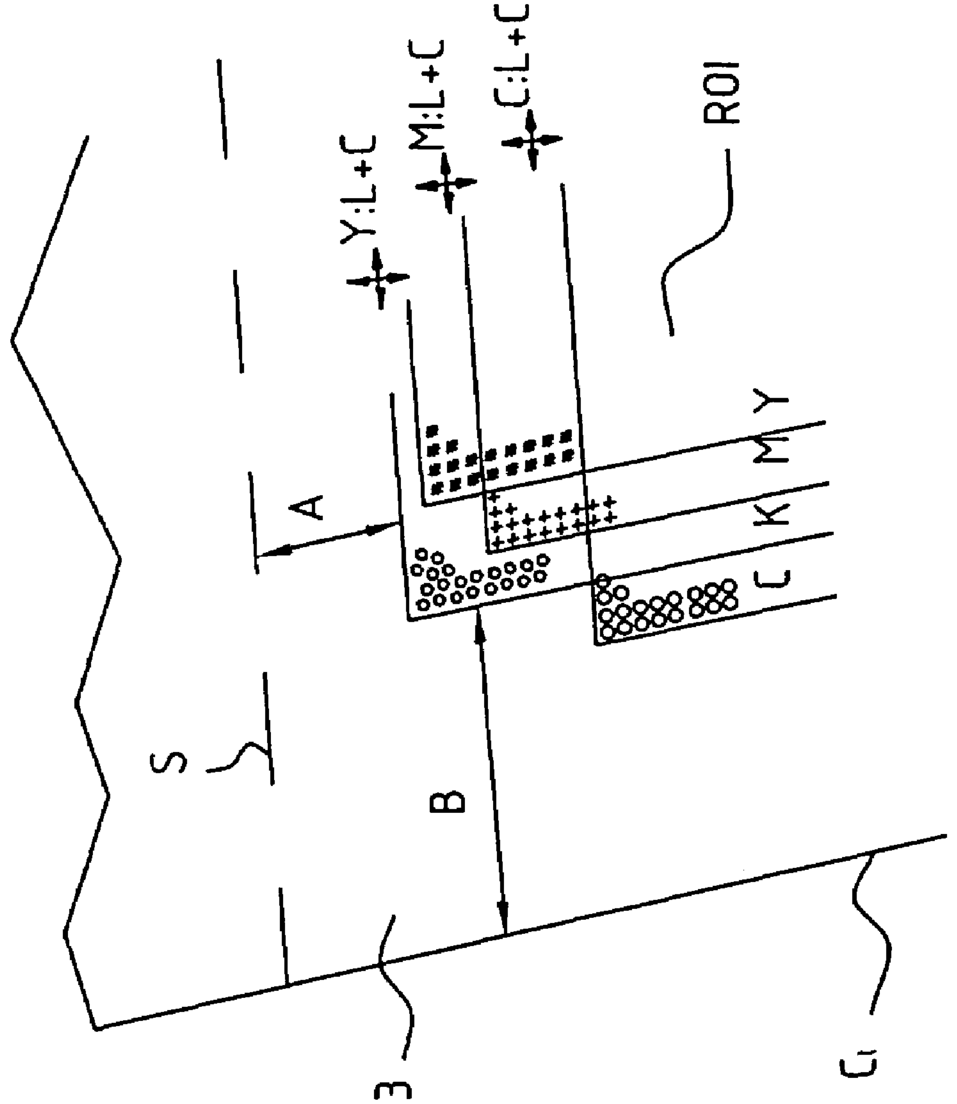
FIG. 13 is a schematic representation of a part of the paper web having thereon an image with colours not in register.

In order to control the colour register, detecting device 5 first determines the position on the basis of the black colour K for a given ROI in the image I, for instance an illustration. This position on paper web 3 is measured in tenths of millimetres, in the x direction relative to the cutting position S of the repeating printed image (FIG. 13), and in y direction relative to the mechanical centre $C_L$ of printing installation 2. The measurement values A, B are passed to the comparing and correcting device 6, where they are compared to the corresponding values in the original O. The results of this comparison are used in turn to control printing installation 2 so as to hold the cutting position and the position of paper web 3 constant in the y direction.

For each colour C, Y, M in the relevant ROI the distance is then measured relative to the colour black K in both the transverse direction L (laterally) and the peripheral direction C (circumferentially) of the cylinders, i.e. the y direction respectively the x direction of paper web 3. These measurement values are also fed to the comparing and correcting device 6, where they are again compared to the corresponding values of the original O. Possible differences, which therefore represent errors in the colour register, are used to control colour register correction motors of the separate printing presses 8, such that the colour register is once again restored. The algorithms used herein for searching the colours and determining the differences correspond for the greater part with those described in the older European patent 0 850 763 of applicant.

Figure 5:
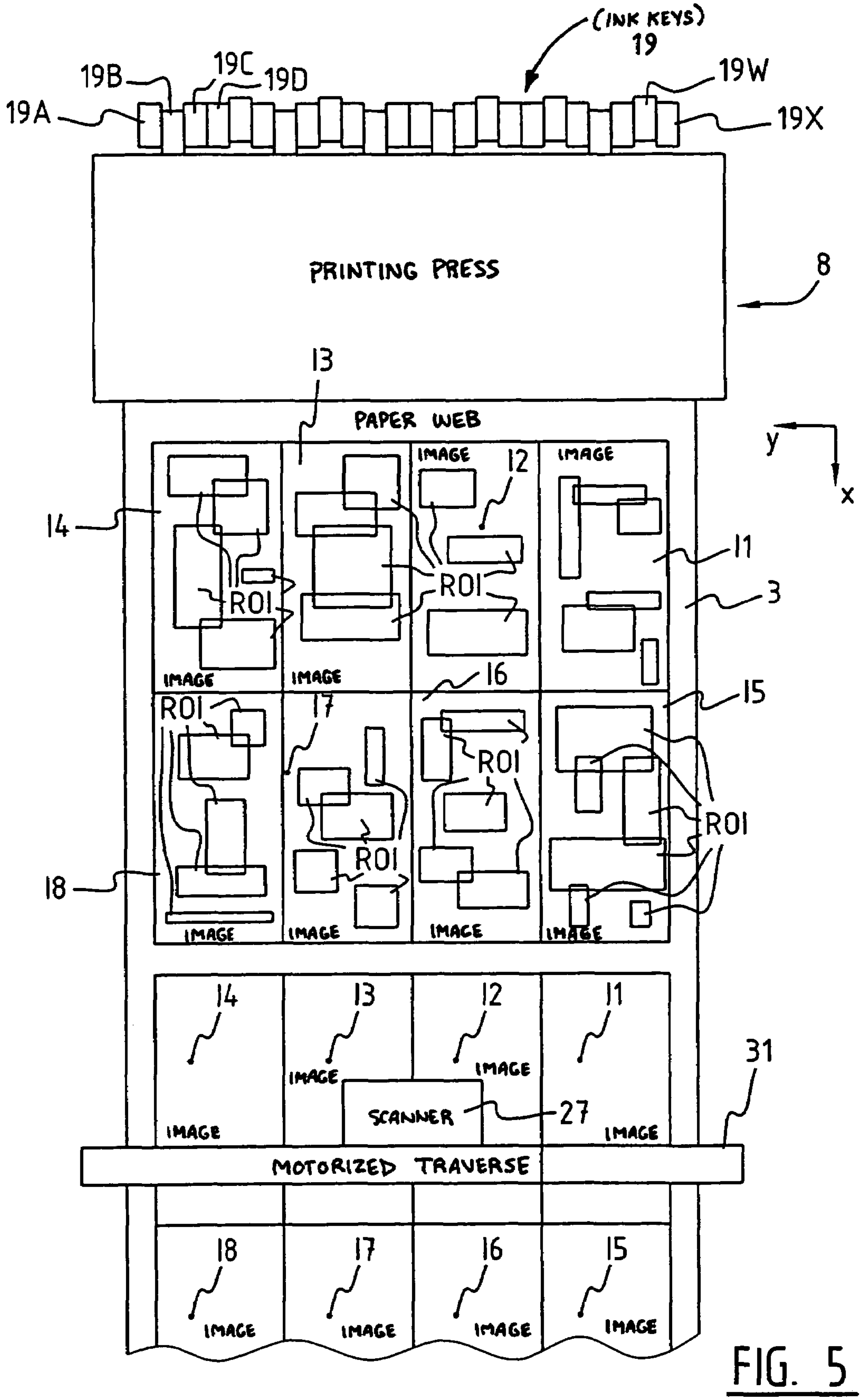
FIG. 5 shows a view of the paper web according to arrow V in FIG. 1, in which the distribution of a number of regions over the image for printing can also be seen.

In the shown embodiment the detecting device 5 comprises two scanners 27 placed on either side of the paper web. Each scanner 27 is here formed by a digital colour camera 28 with CCD-matrix, a lens 29 and a lighting unit 30. The CCD-matrix of the camera makes colour records in the RGB. (Red, Green, Blue) format known from television. For financial reasons use is made of scanners 27 which have a field of view covering only a limited portion of the width of paper web 3, and which are each movable in transverse direction by means of a motorized traverse 31 (FIG. 5).

Figure 7:
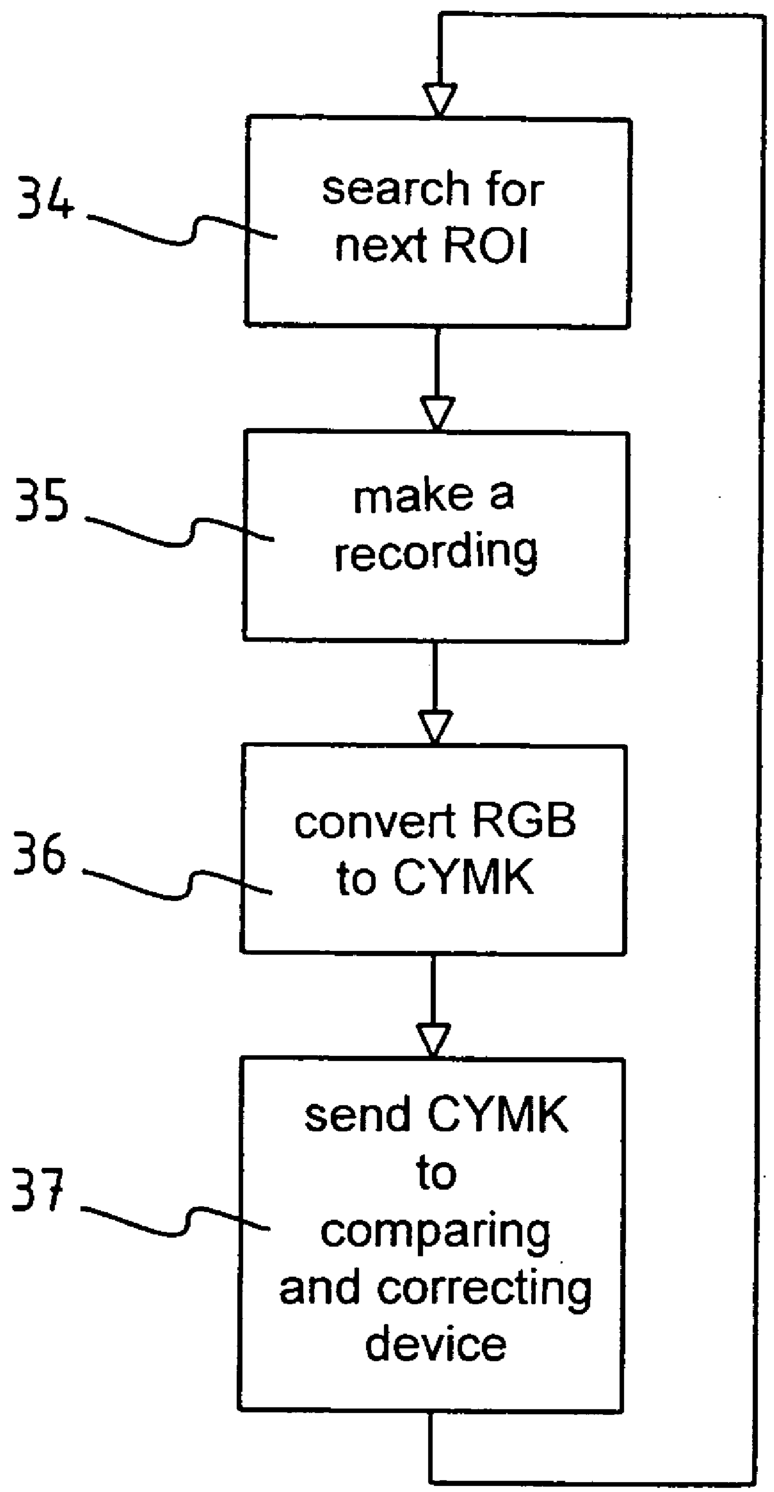
FIG. 7 is a flow diagram which shows schematically the operation of the detecting device of the control system according to the invention.

The detecting device 5 comprises a control part 32, for instance a computer, which drives scanners 27 to the correct position (y coordinate) on traverse 31 on the basis of the data from the ROI-files (FIG. 7 step 34). In order to determine the position in longitudinal direction of paper web 3 (x coordinate) use is made of a signal from a pulse generator 33, which is connected to one of the printing presses 8. After all, the angular position of printing press(es) 8 is at any moment directly linked to the position of the already printed images I in the longitudinal direction x of paper web 3. When scanner 27 is situated at the correct y coordinate and it is possible to infer from the signal from pulse generator 33 that the searched ROI is lying in the field of view of scanner 27, a record is made (step 35).

Computer 32 is further adapted to correct the records made by scanners 27 for differences which are the result of instability and imperfections in the equipment used. Examples of such differences are a non-homogenous lighting, variations in the intensity of the lighting, variations and inaccuracies in the CCDs, non-linearity of the measurement of the tonal range and the background colour of the paper.

In addition, computer 32 is adapted to convert the measured RGB values into corresponding values in the CYMK format usual at printing companies (step 36). Use is made for this purpose of lookup tables, comparable to CIELAB colour tables, which include the corresponding values in these two formats. In order to compile these tables use is made of a neural network, which is initially "trained" by providing a large number of CYMK colours with matching RGB images. These tables are calculated for each CCD on the basis of the starting point that the signal of the CCD is defined for each pixel by the quantity of incident light. This quantity of incident light can be described as:

$$u=t\cdot\int f(x)\cdot g(x)dx \quad (1)$$

in which t is the time, f(x) the spectral distribution of the incident light and g(x) the spectral distribution of the CCD. This latter value is given by the manufacturer, while the spectral distribution of the incident light is determined by, among other factors, the ink colours, the paper type and the light source used.

For the definition of colours for the purpose of determining the tables, applicant has developed his own method which provides a definition of each colour in three dimensions in a table. Herein the colour is first separated from the intensity (luminance) L, and the colour vector is then normalized and increased with a factor. This increment factor is necessary to be able to express colour differences in a number which corresponds with the inspection by the human eye. The relations used in the definition are:

$$L=(R+G+B)/3\ R,G,B\epsilon[0,1] \quad (2)$$

$$a=(R/(R+G+B))^{1/2}\ R,G,B\epsilon(0,1] \quad (3)$$

$$g=(G/(R+G+B))^{1/2}\ R,G,B\epsilon(0,1] \quad (4)$$

From the RGB values produced by the CCD matrix the associated CYM values are derived, as stated, on the basis of the lookup table in computer 32 of detecting device 5. On the basis of the ratio between the values of C, Y and M on the one hand and K on the other as can be found in the reference files 25 for the relevant ROI for the derived CYM values, an associated K value is then determined. The values of C, Y, M and K thus finally found in the record of the ROI are sent from detecting device 5 to the comparing and correcting device 6 (step 37).

In the comparing and correcting device 6, formed here by a computer, the CYMK values received from detecting device 5 (FIG. 7, step 38) are first corrected for inter alia the fact that detecting device 5 inspects the printed material while the ink is still wet (step 39). In the shown embodiment the detecting device 5 is after all situated directly downstream of the final printing press 8 and upstream of a possibly present drying street in which the ink is dried. This arrangement ensures that the control can respond very quickly, but entails that the colours measured by detecting device 5 are not yet the definitive colours of the printed material. In the comparing and correcting device 6 there are therefore stored correction graphs which indicate the progression of each colour C, Y, M and K as a function of the drying time. On the basis of the known distance between each of the printing presses 8 and detecting device 5 on the one hand and the also known speed of paper web 3 on the other, it is possible to determine for each colour the elapsed time at the moment detecting device 5 is passed. At this time the necessary correction can then be read for the relevant colour in the correction graph.

If desired, detecting device 5 of the monitoring system according to the invention can also be placed downstream of the drying street. In that case the final print image is detected and the use of correction graphs for drying can be dispensed with.

In the comparing and correcting device 6 the colours are also corrected for differences resulting from variations in ambient influences, such as temperature and air humidity.

Once the measured colours have been thus corrected, and the colours have in fact been obtained as they would be detected after drying of the printed material, the possible differences in the printed material can be determined (step 40). For this purpose the value of the tonal range measured in the ROI for each of the colours C, Y, M and K is compared to the corresponding value of the tonal range in the reference file and converted to a relative or percentual difference P per colour as according to the relation:

$$P_{colour}=(G-V)/V*100 \quad (5)$$

in which G is the measured value and V the reference value of the tonal range for that colour. The average or equalized value DE of the dot gain of the four colours C, Y, M and K is then determined:

$$DE=(P_C+P_Y+P_M+P_K)/4 \quad (6)$$

whereafter the density DS is determined for each colour by making use of the following formula:

$$\log_{10}(\text{White/ink colour}) \quad (7)$$

This density is therefore an indication of the extent to which a colour is present above the average or, conversely, below the average in the printed image.

The detected values of the equalized dot gain DE and the density DS for each colour and each ROI can be used per se as a basis for adjusting the printing presses 8 to a desired value, but it is also possible to average these values for a number of colours or a number of ROIs.

It is then determined on the basis of the detected values of DE and DS whether the differences have to be corrected by adjusting the ink supply or by adjusting the water supply. To this end the detected differences relative to the dot gain curves (FIG. 12) are collected at different locations in width direction of paper web 3 and converted to a quality factor (step 41) and a check is made as to whether all these differences correspond to each other (step 42). In case of differences on the dot gain curves which occur in ROIs over a part of paper web 3 not related to a single ink key, for instance in the case of a number of ink keys on one side of paper web 3 together, an adjustment of water supply 13 is the most appropriate way to restore a desired ink/water balance (step 43). When on the other hand the differences on the dot gain curves can be related to the density differences and vary over the width of paper web 3 in an ink key range, a correction can take place via ink keys 19, which cover only a part of the width (step 44).

The correction of water supply 13 as well as that of ink supply 12 has a number of different adjustments, one of which can be chosen depending on the magnitude of the detected difference. In the case of water supply 13 there is in the shown embodiment the choice between a normal adjustment and a rougher but quicker adjustment, while in the case of ink supply 12 there is also provided a fine, somewhat slower adjustment. This is elucidated with reference to the control of ink supply 12.

Figure 8:
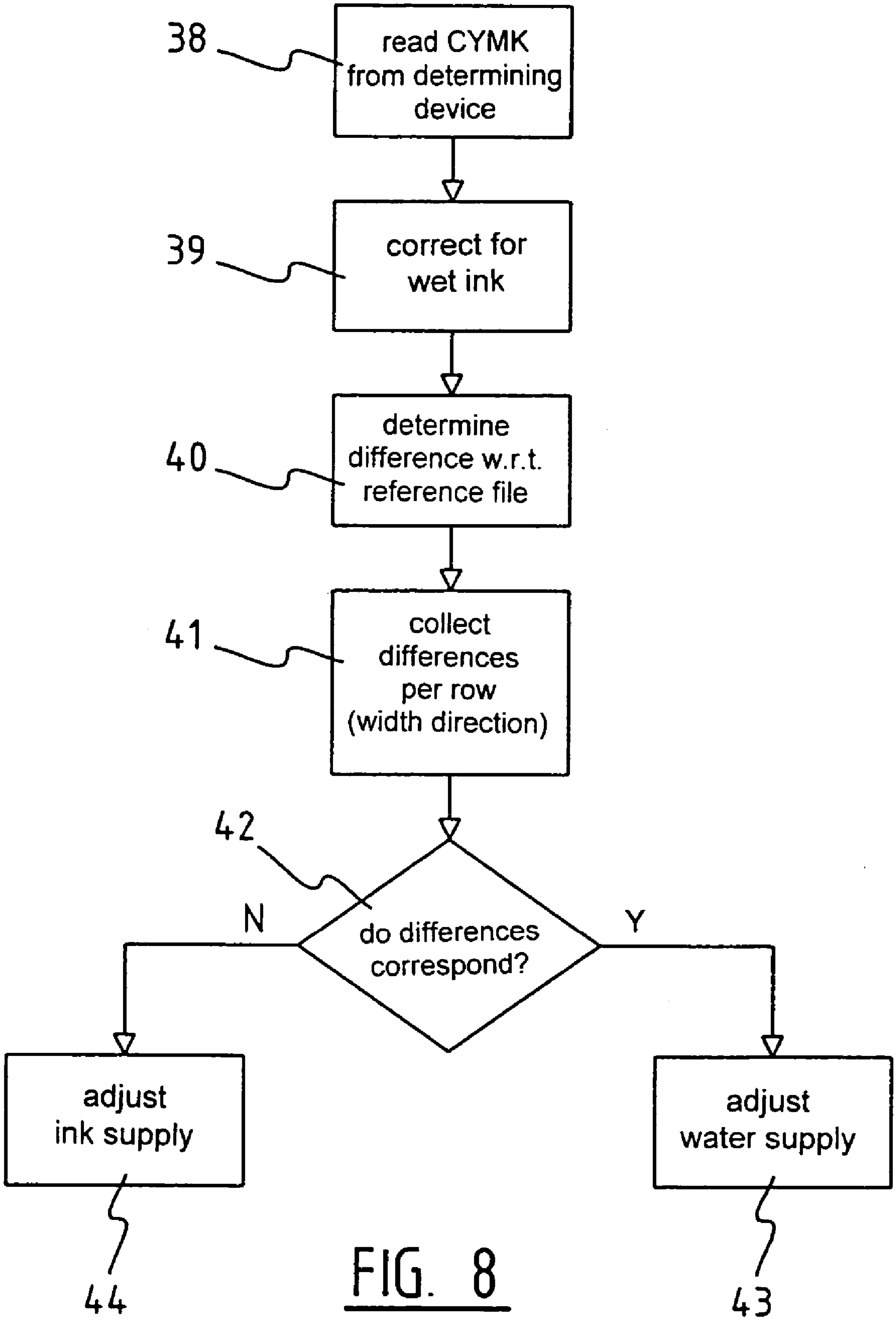
FIG. 8 is a flow diagram which shows schematically the operation of the comparing and correcting device of the monitoring system.

The absolute value of each detected difference DE or DS is first determined (FIG. 8, step 45), whereafter this is compared to a lower limit $T_0$ (step 46). If the value is found to be smaller than this lower limit $T_0$, there is no detectable difference and no correction is required. The program then returns to the start to read in a subsequent difference and to determine the absolute value thereof.

Figure 9:
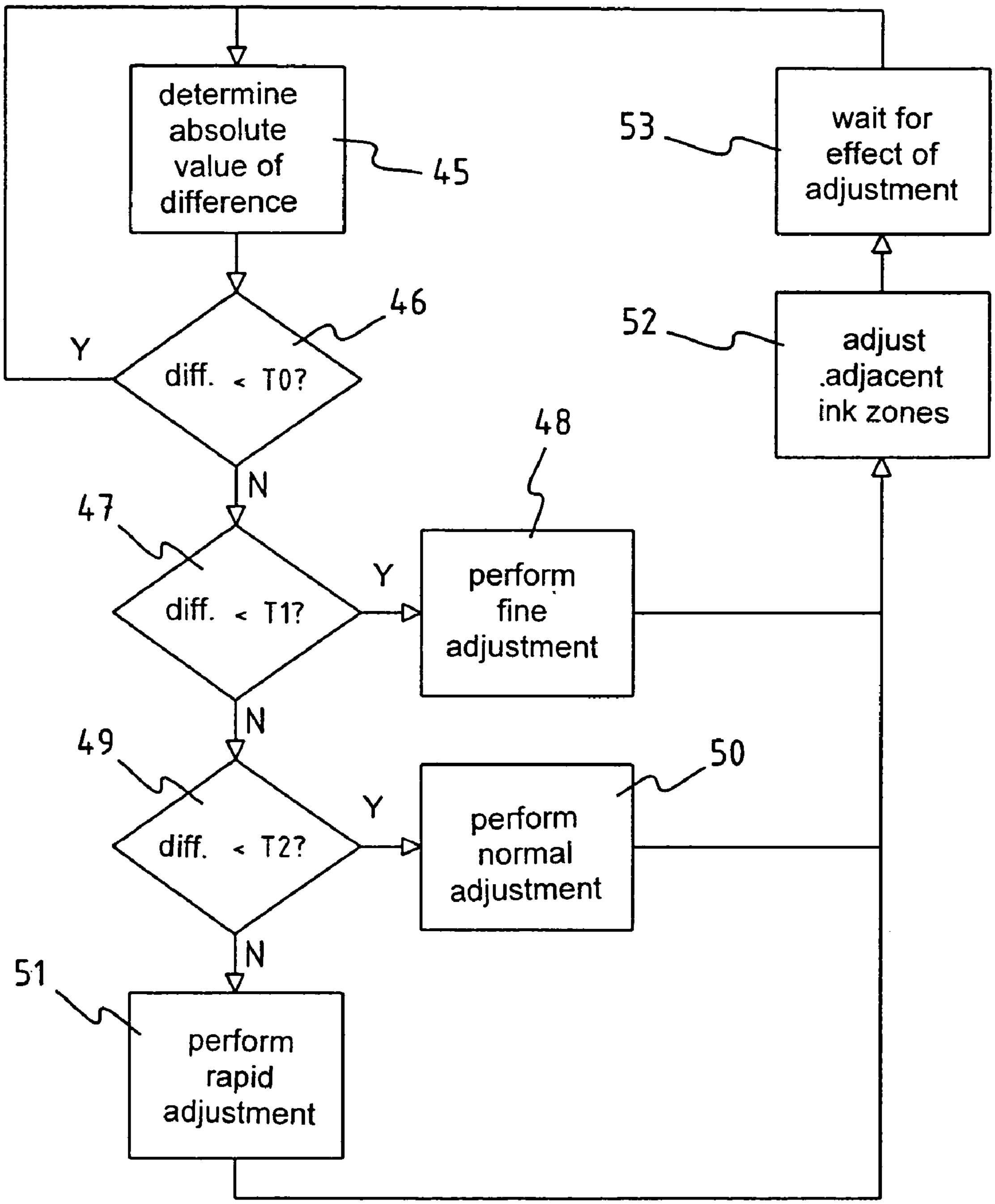
FIG. 9 is a schematic flow diagram of the manner in which a suitable control is chosen by the comparing and correcting device.

If the difference is greater than $T_0$, it is then compared in a subsequent step 47 to a first threshold value $T_1$, which determines a dead zone 55 (FIG. 9). When the difference is smaller than $T_1$, the measured value therefore lies within this dead zone 55 around the reference value REF, and the finer adjustment can in principle be chosen (step 48). To this end one or more subsequent values of the difference are read in, made absolute and compared to the first threshold value $T_1$. If the absolute value of these differences is in each case smaller than the first threshold value, then there is indeed a good approximation of the reference value REF. In that case the finer adjustment is chosen, wherein the differences are averaged and, on the basis of this average difference, ink supply 12 is controlled such that the final result comes out in a fine zone 54 around the reference value REF. This control results slowly but surely in an accurate outcome.

If on the other hand the difference is greater than the first threshold value, it is then compared in a following step 49 to a second threshold value $T_2$, which determines an average zone 56. When the difference is smaller than this second threshold value $T_2$, and the measured value thus falls outside the dead zone 55 but within the average zone 56, the normal adjustment is chosen (step 50). One or more subsequent differences are here read in, made absolute and averaged with the preceding value(s) of the difference. The average is then compared again to the first threshold value $T_1$. If this average is greater than the first threshold value, i.e. it is situated outside the dead zone 55, a correction is then carried out by adjusting the ink supply 12. Standard variations are thus corrected rapidly and with certainty.

If the difference is greater than $T_2$, i.e. it is situated outside the average zone 56, a relatively crude but rapid adjustment is chosen, wherein ink supply 12 is immediately adjusted without prior averaging with one or more subsequent measurements. Large errors are thus corrected immediately, and saleable printed material can be produced as quickly as possible.

It is otherwise possible to envisage the difference being so great that it can no longer be remedied with the usual correction mechanisms. A situation which comes to mind here is that one of the printing plates is mounted wrongly on a printing press, or even on the wrong press, for instance an M-plate on the C-press. Another example is the ink supply becoming blocked. In these cases colours are printed at wholly incorrect positions, or are no longer printed at all. The monitoring system 1 responds to this type of great differences by generating a warning signal, which can be shown as a message on the display of the general control system 7, or which can take the form of activating an alarm light or bell. The operators can then stop printing installation 2 before large quantities of worthless printed material are produced. This enables major cost-saving, particularly during start-up.

Figure 10:
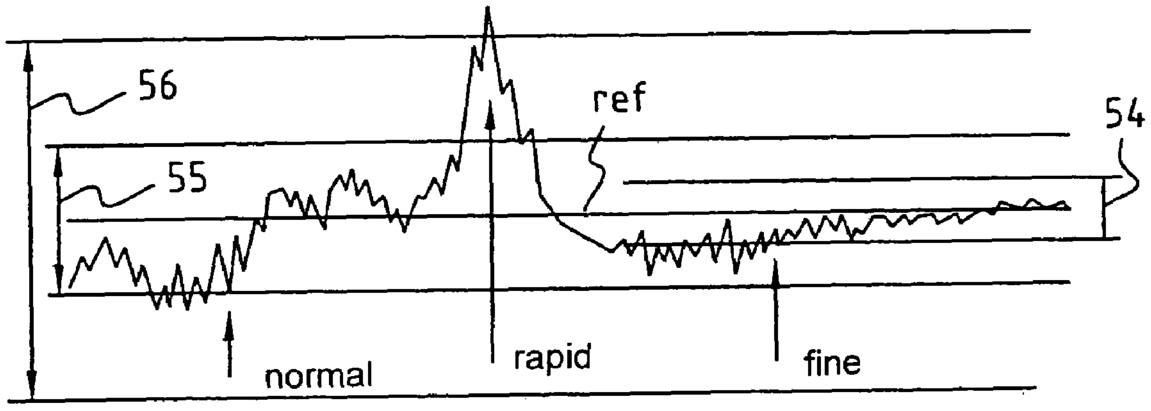
FIG. 10 shows an example of possible differences and the corrections applied therein by the comparing and correcting device.
Figure 11:
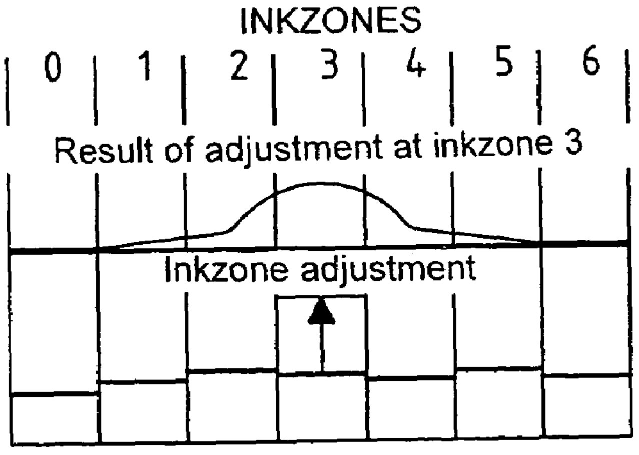
FIG. 11 shows schematically a possible correction via one of the ink keys of the printing press of FIG. 2, as well as the effect thereof on adjacent parts of the printed material.

When ink supply 12 is adjusted by changing the setting of one of the ink keys 19, the effect hereof on the adjacent part of the printed material must be taken into account. Because an ink roller 18 is not compartmentalized, the ink layer defined by ink keys 19 flows out in width direction of ink roller 18, so that increasing the thickness of the ink layer in an ink zone—the central ink zone in the example in the lower half of FIG. 10—also results in an increase in the thickness of the layer in a part of the adjacent zones, as can be seen in the upper half of FIG. 10. This effect can be compensated by either adjusting ink keys 19 in these relevant zones such that they dispense a slightly smaller layer thickness, or by modifying the setting of ink key 19 in the zone for correcting to a slightly lesser extent than would actually be optimal for the sought correction.

In order to determine the effects on adjacent ink zones, use is made of a self-learning control system on the basis of tables which include for each ink key the percentual effects on two adjacent ink zones per side (therefore a total of four ink zones). The actual effects are constantly measured and, on the basis of differences between the measured effects and the effects according to the tables, the table values can be slightly modified. Variations in these effects, for instance as a result of fluctuations in humidity and temperature, differences in the viscosity and/or wear, can hereby be compensated.

Once a correction has been carried out, there is a wait time before a series of measurements is again carried out that are used for the relevant control. This is because the effects of corrections can only be detected with a delay and it is necessary to prevent the adjustment becoming unmanageable. After a correction signal has been sent to a controller 57 for ink keys 19 of one of the printing presses 8 and ink keys 19 have taken up their new position, the desired layer thickness of ink is dispensed onto ink roller 19. It will then however be some time before this ink is finally printed onto paper web 3 via plate cylinder 11 and rubber cloth cylinder 10. Some further time then passes before the relevant images I reach detecting device 5. The time T which elapses before the effect of a correction can be measured by detecting device 5 amounts to:

$$T=KD/MS+(MB/V)*100/IV+LB/V \qquad (8)$$

in which KD is the Link value for correcting, MS the motor speed (in Δink/second), MB the distance (in metres) which the ink must travel through printing press 8 to reach paper web 3, V the speed of printing press 8 (in metres per second), IV the percentual transfer of new ink which causes the delay in the passage of ink in printing press 8, and LB the distance of printing press 8 from detecting device 5 (in metres). Expressed in the number of cylinder revolutions, the wait time WT becomes:

$$WT=T/V*CD \qquad (9)$$

in which CD is the diameter of rubber cloth cylinder 10 or the length of the repeating printed material.

During the wait time the printed material is however monitored continuously in order to keep track of the quality development and optionally be able to carry out interim corrections in the case of sudden large differences.

As stated, water supply 13 is controlled in similar manner to ink supply 12, be it that in the shown embodiment only two control levels are used herein, a normal and a rapid control. In the case of water supply 13 less account need be taken of the effects on adjacent zones, since water supply 13, at least in the shown system with a water reservoir 15 in which a water roller 17 rotates, is substantially constant over the whole width of the cylinders.

The above described method and the associated control system make it possible to accurately monitor the quality of printed material and rapidly correct possible differences. Compared to the controls known heretofore, the invention provides a large number of advantages:

Because in the colour control according to the invention use is made of a direct comparison between the printed material and the original, which is derived from the supplied digital files, by undoing corrections which have been made thereto, variations in the printing installation, the quality of the paper and the inks do not have any significant effect. The regular calibration of the printing installation can hereby be dispensed with, which saves time and cost.

The corrections carried out on the supplied digital files can also be used to determine an accurate presetting of the colours prior to printing. The quality of the printed material is hereby already very good immediately after start-up, and the use of correction graphs for the behaviour of the ink keys can be dispensed with.

Because the colours and the colour register of the actual printed material are measured, a colour bar no longer need be co-printed, whereby paper, ink and preprocessing time are saved, while the appearance of the printed material moreover becomes more attractive. Measurement in the printed image itself also provides more and better information than a measurement in a relatively small colour bar outside the actual printed image.

By making use of variable and intelligent conversion formulas instead of a fixed relation to convert the measured RGB values into CYMK values, variations in the inks used, the paper, the printing installation and the environment have no effect on the accuracy of the conversion.

In addition, the control is very rapid, because the printed material is monitored immediately after leaving the final printing press. Saleable printed material is hereby already obtained shortly after start-up, while the colour consistency during the whole printing process is better than in systems where monitoring only takes place after drying of the printed material. The monitoring system can also be readily integrated into a printing installation owing to the chosen placing of the detecting device. This rapid control on the basis of an inspection immediately after the printing press is possible because use is made of correction graphs, with which the colour changes during drying of the inks is compensated. This compensation can be used in so-called coldset and heatset printing processes.

The monitoring system can further be of simple design, because the detection of possible differences remains limited to relatively small regions of the printed material (ROIs) where the anticipated differences can be best detected. These regions can be found in efficient manner by the detecting device through a combination of a precise determination of the position in both longitudinal and transverse direction and the use of image recognition software. This enables start-up of the colour control while the printed material is not yet lying in register, whereby good printed material can again be produced very quickly.

In addition, the manner in which the measurements of the detecting device are processed makes it possible to accurately derive both the density and the grid point size of the printed material from the measured values. This enables very good monitoring of the printed colours.

Because the measured density and grid point size are combined in intelligent manner so as to determine the correction signals which are ultimately sent to the ink supply mechanism and the water supply mechanism, the final adjustment is moreover very accurate.

Finally, the monitoring system according to the invention provides the option of also using the inspections of the colours and the comparison thereof to the reference image to control the colour register, the fan-out register, the cut-off register and the sidelay register. An integrated control of the total quality of the printed material is thus achieved, whereby a considerable simplification and saving can be realized compared to separate systems for the colour control and the register control.

Because measurements are taken in the whole printed image, detailed distinction can herein be made between differences which result from deformation of the paper (fan-out) and differences which have other causes, and can be corrected by means of the colour register correction motors. When different printing plates are used, differences in the mutual position of the printing plates can also be measured and corrected in this manner.

Although the invention is described above on the basis of an embodiment, it will be apparent to the skilled person that it can be varied in many ways within the scope of the following claims. All new aspects described above are relevant per se for the invention, and could also be used in combination with other controls while retaining the advantages associated with the invention. The scope of the invention is defined solely by the appended claims.

The invention claimed is:

1. A method for monitoring printed material which is produced by a printing press and comprises one or more images printed on a substrate, in particular a paper web, comprising the steps of:

a) determining, in at least one original for printing, reference values for one or more chosen parameters of the printed material, b) detecting the values of these parameters in the corresponding printed image, c) comparing the detected values to the reference values, d) performing a correction when a difference in one or more values is found during the comparison;

wherein the at least one original is available in the form of a digital data file and an inspection of the printed image is digitized prior to the comparison; and wherein the digital data file is pre-processed to correct differences during printing, and the reference values are derived from the data file by undoing the pre-processing.

2. The method as claimed in claim 1, wherein the chosen parameters comprise the colours in the printed material, the location of the images in the printed material, the colour register of the printed material, or any combination thereof.

3. The method as claimed in claim 2, wherein the reference values are determined in automatically chosen regions within the at least one original, and an inspection takes place in the corresponding regions in the printed image.

4. The method as claimed in claim 3, wherein the colours for printing are built up of a number of basic colours, and the regions are chosen such that each basic colour is present in at least one region.

5. The method as claimed in claim 4, wherein a number of inspections are performed for at least some of the colours, and a quality factor for the relevant colour(s) is derived from the found differences.

6. The method as claimed in claim 3, wherein the inspection takes place while the printed material is still wet, and the detected colours for comparing are corrected for colour changes during drying.

7. The method as claimed in claim 3, wherein the printed material is illuminated constantly during the inspection.

8. The method as claimed in claim 1, wherein RGB colour codes in the digital inspection of the printed image are converted prior to the comparison into CYMK-colour codes on the basis of lookup tables.

9. The method as claimed in claim 1, wherein the correction is performed by adjusting a quantity of ink applied to the substrate by the printing press.

10. The method as claimed in claim 9, wherein the quantity of ink applied to the substrate is adjusted by adjusting a quantity of ink and/or water supplied to the printing press.

11. The method as claimed in claim 9, wherein the adjustment of the colours takes place on the basis of CIELAB colour value, density, size of grid points and/or contrast value.

12. The method as claimed in claim 1, wherein after a correction has been performed a subsequent inspection and comparison is only carried out after a waiting time has elapsed.

13. The method as claimed in claim 1, wherein the magnitude of the differences is determined and subject thereto a choice is made for performing the corrections between at least a cruder and a finer adjustment.

14. A system for monitoring printed material which is produced by a printing press and comprises one or more images printed on a substrate, in particular a paper web, comprising:

a device for determining, in at least one original in the form of a digital data file for printing, reference values for one or more chosen parameters of the printed material, wherein the reference values are derived from the digital data file, which has been pre-processed to correct differences during printing, the determining device undoing the pre-processing of the digital data file to derive the reference values, a device for detecting the values of these parameters in a corresponding printed image and for making a record of the printed image and digitizing the image, and a device controlling the printing press which is connected to the determining device and the detecting device for comparing the detected values to the reference values, and for carrying out corrections in the case of a difference in one or more parameters.

15. The monitoring system as claimed in claim 14, wherein the determining device is adapted to determine reference values for the colours in the printed material.

16. The monitoring system as claimed in claim 15, wherein the determining device is adapted to automatically choose regions within the at least one original, and to determine the reference values in these automatically chosen regions, and the detecting device is connected controllably to the determining device in order to be able to detect the parameters in the corresponding regions in the printed image.

17. The monitoring system as claimed in claim 16, wherein the colours for printing are built up of a number of basic colours, and the determining device is adapted to choose the regions such that each basic colour is present in at least one region.

18. The monitoring system as claimed in claim 17, wherein the detecting device is adapted to perform a plurality of inspections for at least some of the colours, and the comparing and correcting device is adapted to derive a quality factor for the relevant colour(s) from differences that are found.

19. The monitoring system as claimed in claim 18, wherein the detecting device is placed close to the outlet of the printing press, and the comparing and correcting device is adapted to correct the inspected colours for colour changes during drying thereof.

20. The monitoring system as claimed in claim 14, wherein the determining device is adapted to determine reference values for the location of the images in the printed material.

21. The monitoring system as claimed in claim 14, wherein the determining device is adapted to determine reference values for the colour register of the printed material.

22. The monitoring system as claimed in claim 14, wherein the detecting device comprises at least one digital camera.

23. The monitoring system as claimed in claim 22, wherein the detecting device comprises means for constant illumination of the printed material.

24. The monitoring system as claimed in claim 14, wherein the detecting device or the comparing and correcting device is adapted to convert RGB colour codes in the digital record of the printed image into CYMK-colour codes prior to the comparison on the basis of lookup tables.

25. The monitoring system as claimed in claim 14, wherein the comparing and correcting device is adapted to adjust a quantity of ink applied to the substrate by the printing press.

26. The monitoring system as claimed in claim 25, wherein the comparing and correcting device is adapted to adjust a quantity of ink and/or water supplied to the printing press.

27. The monitoring system as claimed in claim 26, wherein the detecting device and the comparing and correcting device are adapted to observe a wait time after activation of the comparing and correcting device.

28. The monitoring system as claimed in claim 14, wherein the comparing and correcting device is adapted to determine the magnitude of the differences, and has at least a cruder and a finer adjustment between which a choice is made subject to this magnitude.

29. The monitoring system as claimed in claim 14, wherein the system is adapted to adjust the colours on the basis of CIELAB colour value, density, size of grid points and/or contrast value.

30. A method for monitoring printed material which is produced by a printing press and comprises one or more images printed on a substrate, in particular a paper web, comprising the steps of:

a) determining, in at least one original for printing, reference values for one or more chosen parameters of the printed material;

b) detecting the values of these parameters in the corresponding printed image;

c) comparing the detected values to the reference values; and d) performing a correction when a difference in one or more values is found during the comparison;

wherein the chosen parameters comprise the colours in the printed material;

wherein the reference values are determined in automatically chosen regions within the at least one original, and an inspection takes place in the corresponding regions in the printed image; and wherein the inspection takes place while the printed material is still wet, and the detected colours for comparing are corrected for colour changes during drying.

31. The method as claimed in claim 30, wherein the detected colours for comparing are corrected for ambient influences such as temperature and air humidity.

32. A system for monitoring printed material which is produced by a printing press and comprises one or more images printed on a substrate, in particular a paper web, comprising:

a device for determining, in at least one original for printing, reference values for one or more chosen parameters of the printed material, a device for detecting the values of these parameters in a corresponding printed image, and a device controlling the printing press which is connected to the determining device and the detecting device for comparing the detected values to the reference values, and for carrying out corrections in the case of a difference in one or more parameters, wherein the determining device is adapted to determine reference values for the colours in the printed material;

wherein the determining device is adapted to automatically choose regions within the at least one original, and to determine the reference values in these automatically chosen regions, and the detecting device is connected controllably to the determining device in order to be able to detect the parameters in the corresponding regions in the printed image;

wherein the colours for printing are built up of a number of basic colours, and the determining device is adapted to choose the regions such that each basic colour is present in at least one region;

wherein the detecting device is adapted to perform a plurality of inspections for at least some of the colours, and the comparing and correcting device is adapted to derive a quality factor for the relevant colour(s) from differences that are found; and wherein the detecting device is placed close to the outlet of the printing press, and the comparing and correcting device is adapted to correct the inspected colours for colour changes during drying thereof.

33. The monitoring system as claimed in claim 32, wherein the comparing and correcting device is adapted to correct the inspected colours for ambient influences such as temperature and air humidity.

34. A method for monitoring printed material which is produced by a printing press and comprises one or more images printed on a substrate, in particular a paper web, comprising the steps of:

a) determining, in at least one original for printing, reference values for one or more chosen parameters of the printed material;

b) detecting the values of these parameters in the corresponding printed image;

c) comparing the detected values to the reference values; and d) performing a correction when a difference in one or more values is found during the comparison;

wherein the chosen parameters comprise the colours in the printed material;

wherein the reference values are determined in automatically chosen regions within the at least one original, and an inspection takes place in the corresponding regions in the printed image;

wherein the colours for printing are built up of a number of basic colours, and the regions are chosen such that each basic colour is present in at least one region; and wherein a number of inspections are performed for at least some of the colours, and a quality factor for the relevant colour(s) is derived from the found differences.

35. A system for monitoring printed material which is produced by a printing press and comprises one or more images printed on a substrate, in particular a paper web, comprising:

a device for determining, in at least one original for printing, reference values for one or more chosen parameters of the printed material;

a device for detecting the values of these parameters in a corresponding printed image; and a device controlling the printing press which is connected to the determining device and the detecting device for comparing the detected values to the reference values, and for carrying out corrections in the case of a difference in one or more parameters, wherein the determining device is adapted to determine reference values for the colours in the printed material;

wherein the determining device is adapted to automatically choose regions within the at least one original, and to determine the reference values in these automatically chosen regions, and the detecting device is connected controllably to the determining device in order to be able to detect the parameters in the corresponding regions in the printed image;

wherein the colours for printing are built up of a number of basic colours, and the determining device is adapted to choose the regions such that each basic colour is present in at least one region; and wherein the detecting device is adapted to perform a plurality of inspections for at least some of the colours, and the comparing and correcting device is adapted to derive a quality factor for the relevant colour(s) from differences that are found.

* * * * *